United States Patent [19]

Sinclair

[11] Patent Number: 5,548,219
[45] Date of Patent: Aug. 20, 1996

[54] DIGITAL TWO FREQUENCY GENERATOR FOR USE IN BOREHOLE HETERODYNE MEASUREMENT SYSTEMS

[75] Inventor: Paul L. Sinclair, Kemah, Tex.

[73] Assignee: Halliburton Company, Houston, Tex.

[21] Appl. No.: 43,716

[22] Filed: Apr. 8, 1993

[51] Int. Cl.$^6$ .............................. G01V 3/30; H03B 19/00; H03B 21/01; H03K 3/02
[52] U.S. Cl. .................. 324/338; 324/76.41; 327/106; 327/113; 327/129; 327/184; 327/355
[58] Field of Search ............................. 324/338, 339, 324/341, 76.41, 76.47, 76.48, 76.77, 76.82, 76.83, 639–641; 327/105–107, 113–117, 184, 293–295, 355

[56] References Cited

U.S. PATENT DOCUMENTS

| | | | |
|---|---|---|---|
| 4,185,238 | 1/1980 | Huchital et al. ...................... 324/338 |
| 4,300,098 | 11/1981 | Huchital et al. ...................... 324/338 |
| 4,499,422 | 2/1985 | Sinclair ................................. 324/339 |
| 4,774,471 | 9/1988 | Sims et al. ......................... 324/338 X |
| 4,810,970 | 3/1989 | Warren et al. ...................... 324/338 |

*Primary Examiner*—Gerard R. Strecker

[57] ABSTRACT

A system for generating two or more frequencies for a borehole heterodyne measurement system for use in measuring electromagnetic propagation properties of rock is disclosed. A precision clock oscillator supplies a binary counter with clock signals. The output of the binary counter is supplied as address information to one or more pre-programmed ROMs. The ROMs are used to store multiple cycles of desired output signals. Output signals from the counter may also be supplied as square wave local oscillator signals in the system.

9 Claims, 3 Drawing Sheets

DIGITAL TWO FREQUENCY GENERATOR FOR USE IN BOREHOLE HETERODYNE MEASUREMENT SYSTEMS

BACKGROUND OF THE DISCLOSURE

This invention relates to borehole amplitude, frequency, and phase measurement systems employing electromagnetic energy propagation in the vicinity of a well borehole. More particularly, the invention relates to a system for generating a desired precision electromagnetic signal in the megahertz frequency range for use in measuring the properties of resistivity and conductivity of rocks in the vicinity of a well borehole.

It is known that the resistivity or conductivity of rocks in the vicinity of a well borehole may be determined by measuring the attenuation of amplitude and the phase shift induced in a propagated electromagnetic wave signal in the megahertz frequency range from 1 MHz to 15 MHz, and particularly in the range of 1 MHz to 5 MHz. The phase measurement is usually performed between two or more spaced receivers spaced apart longitudinally from a transmitter, all of which are carried internally to a sonde or well logging instrument sized for passage through a well borehole. The transmitted signal and the received signals are usually propagated and detected by coil arrays which may be placed circumferentially about the longitudinal axis of such a sonde.

A major problem present in making phase shift measurements relates to the stability and spectral purity of the generator of the electromagnetic energy and the receiver systems used to detect the received signals. The introduction of phase noise into any parts of such systems can lead to significant errors in the measurement of the physical parameters of the rocks to be measured. Such systems for generating and receiving electromagnetic wave energy in the megahertz frequency ranges of interest may generally employ frequency translation by heterodyne mixing, which may also be employed in high frequency communications systems. Since accurate phase shift measurements can usually be performed more accurately at lower frequencies, the heterodyne mixing method can be used to translate the propagated megahertz range electromagnetic wave signal to a much lower intermediate frequency for phase measurement.

Such heterodyne mixing systems generally require a source of two frequency signals, one for the propagated signal or "stimulus" and one for the local oscillator frequency. These frequencies are the RF and LO frequencies. These signals must have a very precise, fixed frequency and phase relationship to assure accurate measurements.

In the system of the present invention, a very precise crystal controlled master oscillator (MO) drives a binary counter, the contents of which are used to address a high speed, high capacity read only memory (ROM). The output from the ROM is supplied to a high speed digital to analog converter (DAC) which supplies a desired radio frequency (RF) output signal to drive transmitter circuitry. A local oscillator signal can be derived from a signal output from the binary counter prior to its input to the ROM. The contents of the ROM can comprise, for example, eight bit digital representations of amplitude samples of a pure sine wave of the desired output frequency for a large number of cycles.

BRIEF DESCRIPTION OF THE DRAWINGS

The operation of the invention will be better understood by reference to the following detailed description thereof, when taken in conjunction with the accompanying drawings, in which.

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DESCRIPTION OF THE PREFERRED EMBODIMENT

Figure 1:
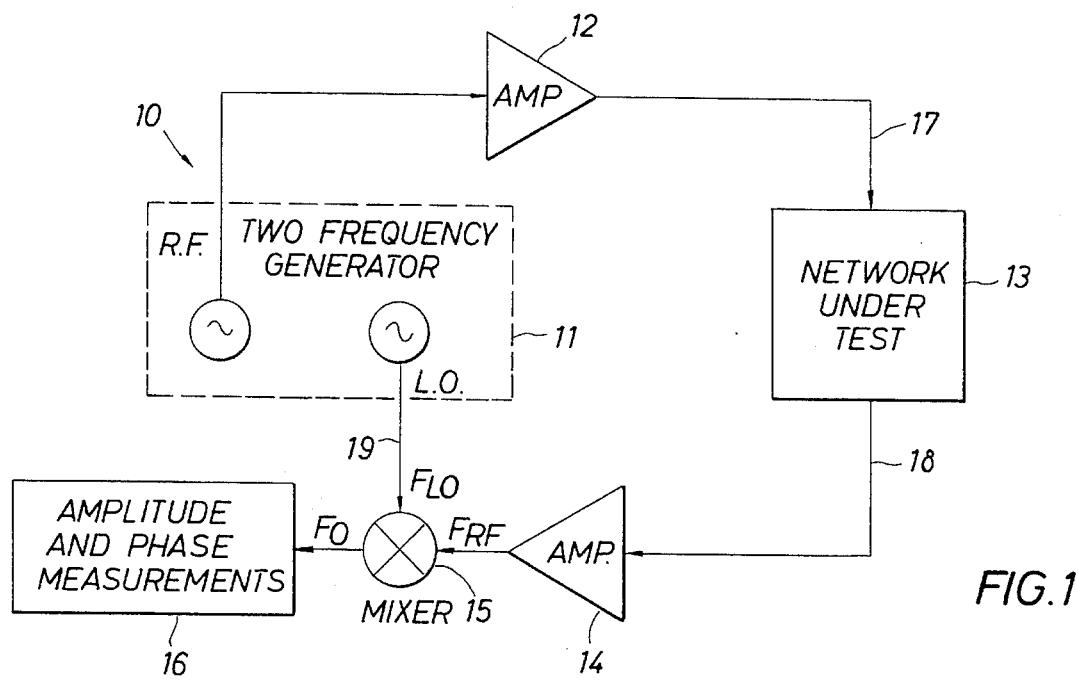
FIG. 1 is a circuit block diagram illustrating schematically a heterodyne mixing system for making amplitude and phase measurements.

Referring initially to FIG. 1, an overall heterodyne mixing measurement system 10 using principles of the present invention is illustrated schematically. A two frequency generator 11 which supplies an RF output signal and a local oscillator LO output signal is shown. The RF output is supplied to a transmitter amplifier 12 and thence to a network 13 under test. The network 13 under test, it may be appreciated, may be an earth formation penetrated by a well borehole. The RF signal input 17 may be supplied to a transmitter coil (not shown) and the network response signal 18 may be derived from a receiver coil (not shown) as previously described.

In any event, a measurement signal is present at line 18 of FIG. 1 and is input to a receiver amplifier 14. This signal is still at the measurement frequency $F_{RF}$ as illustrated. The $F_{RF}$ signal from the amplifier 14 and a local oscillator signal $F_{LO}$ on line 19 are supplied to a heterodyne mixer circuit 15 of FIG. 1. The resulting frequency translated signal at intermediate frequency $F_O$ from the mixer 15 is supplied to an amplitude and phase measurement circuit 16 which operates at the intermediate or output frequency $F_O$ for precise measurements.

Figure 2:
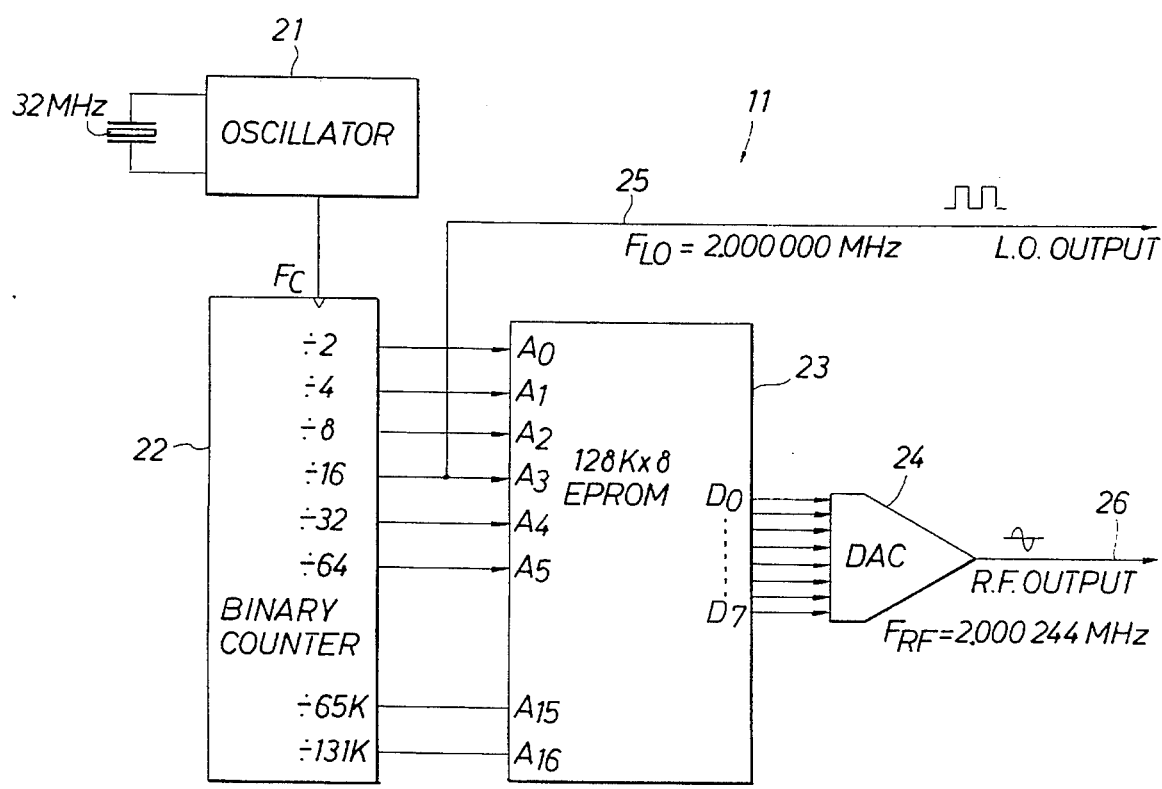
FIG. 2 is a schematic circuit diagram illustrating a two frequency generator in accordance with the present invention for use in a system such as that of FIG. 1.

Referring now to FIG. 2, the two frequency generator circuit corresponding to 11 of FIG. 1 and utilizing concepts of the present invention is shown in more detail.

A precision crystal controlled oscillator circuit 21 is used to generate a precise 32.000 MHz output reference signal. In order to stabilize the frequency of this analog oscillator, the crystal and circuit 21 of FIG. 2 may be contained in an oven which elevates their temperature to greater than the highest expected borehole temperature and maintains a fixed temperature as these circuits transverse the borehole in a well logging sonde.

Figure 3:
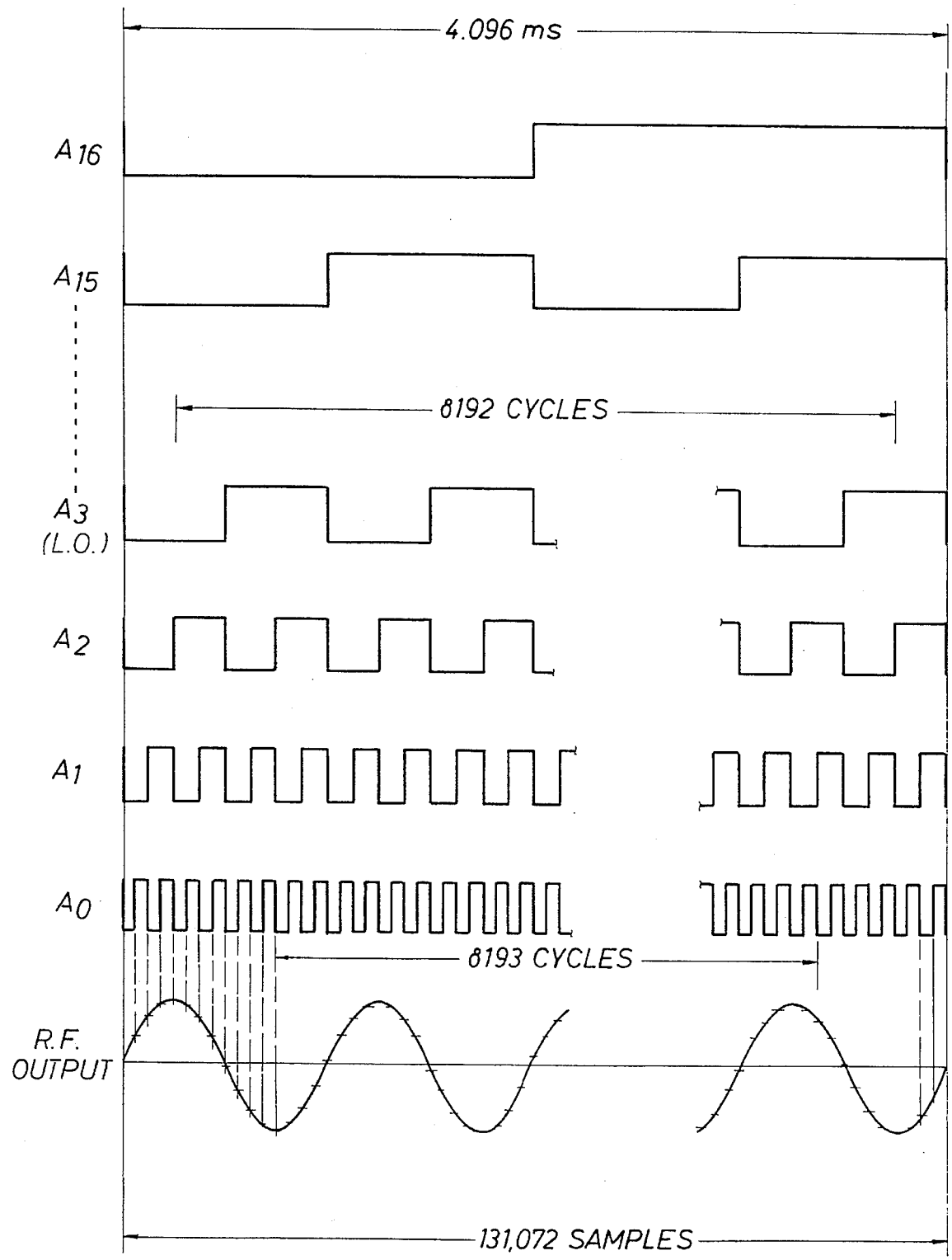
FIG. 3 is a timing diagram for the circuit of FIG. 2.

The 32 MHz output of oscillator 21 is supplied as the input to a 17 stage binary counter 22 which supplies 17 output lines labeled $A_0$ to $A_{16}$ which binary output signals are a zero or one as shown in the timing diagram of FIG. 3.

3

These 17 output signals are supplied as address signals $A_0$–$A_{16}$ on 17 separate address lines that are input to a ROM 23. The ROM 23 is thus supplied with a repetitive sequence of all of the binary numbers from zero to $(2^{17}-1)$ at the 32 MHz rate supplied at the crystal frequency of the precision oscillator 21.

The ROM 23 is an addressable array of 128K eight bit binary words which supplies at its output on eight parallel lines labeled $D_0$–$D_7$ the eight bit content of each successive word addressed by its 17 bit input lines. The 128K memory locations of the ROM 23 are thus programmed to sequentially represent the amplitudes of 8193 cycles of sine waves at the RF output frequency of 2.000244 MHz as illustrated in FIGS. 2 and 3. These 8 bit binary numbers are supplied as inputs to a high speed digital to analog converter (DAC) 24 of FIG. 2. The output of the DAC 24 at any given time is a voltage signal proportional to the eight bit binary number representation of each of the data words stored in the ROM 23. This represents 131,072 samples at a rate slightly less than 16 samples/cycle of the 2.000244 MHz output signal supplied on line 26 of FIG. 2.

Note that a very precise square wave signal of precisely 2.000000 MHz is supplied by the coupling address line $A_3$ of the several address input lines of the ROM 23 as supplied by this output signal from the binary counter 22. This is shown as a local oscillator output signal $F_{LO}$ of 2.000000 MHz on the line 25 of FIG. 2.

With the 32 MHz oscillator clock shown, the complete sequence (endlessly repeated) lasts approximately 4.096 milliseconds which corresponds to a fundamental frequency (output from the mixer 15 of FIG. 1) of 244 Hz. Fourier analysis teaches that the output frequencies (including unwanted harmonic) are all integer multiples of this fundamental frequency. In general, therefore, the following relationships may be defined:

If $F_O$ is the fundamental frequency determined by the clock rate Fc and the total word capacity N of the ROM 23, then $$F_O = F_c/N$$

and the output frequencies of the system are the RF output ($F_{RF}$) and the local oscillator output $F_{LO}$ given by $$F_{RF} = F_O (N/n+1)$$

$$F_{LO} = F_O N/n$$

where n is the number of data words samples per cycle of $F_{LO}$. In the example of FIG. 3, n is 16 but it can be chosen to be any convenient integer number.

Figure 4:
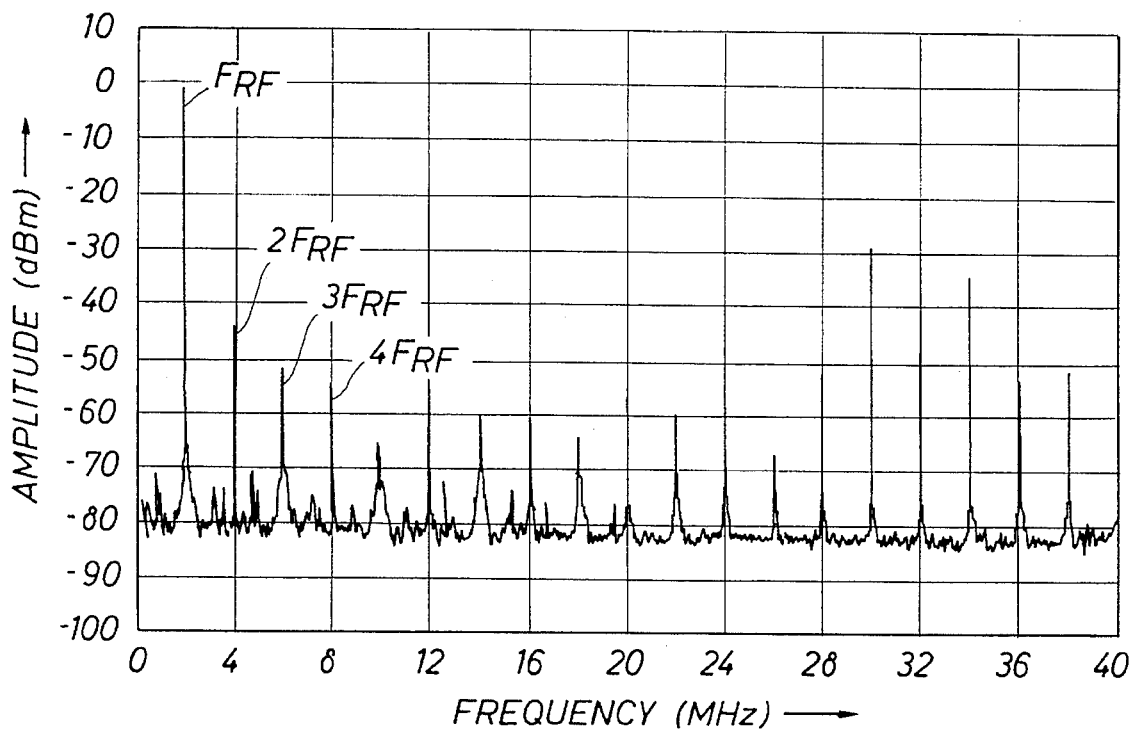
FIG. 4 is a frequency spectrum display of amplitude versus frequency for the system of FIG. 2.

Turning now to the subject of unwanted harmonics that may be present in the RF output, these can be classified into two groups. The first group is integer harmonics of $F_{RF}$ that are due to the limited precision of the DAC 24 to generate accurate voltage levels representative of the sine wave samples. FIG. 4 shows an example of a spectrum of $F_{RF}$= 2.0000244 MHz and the second, third, fourth, etc., harmonics of $F_{RF}$. These integer harmonic are easily filtered from the RF output because of their large frequency separation from $F_{RF}$.

Figure 5:
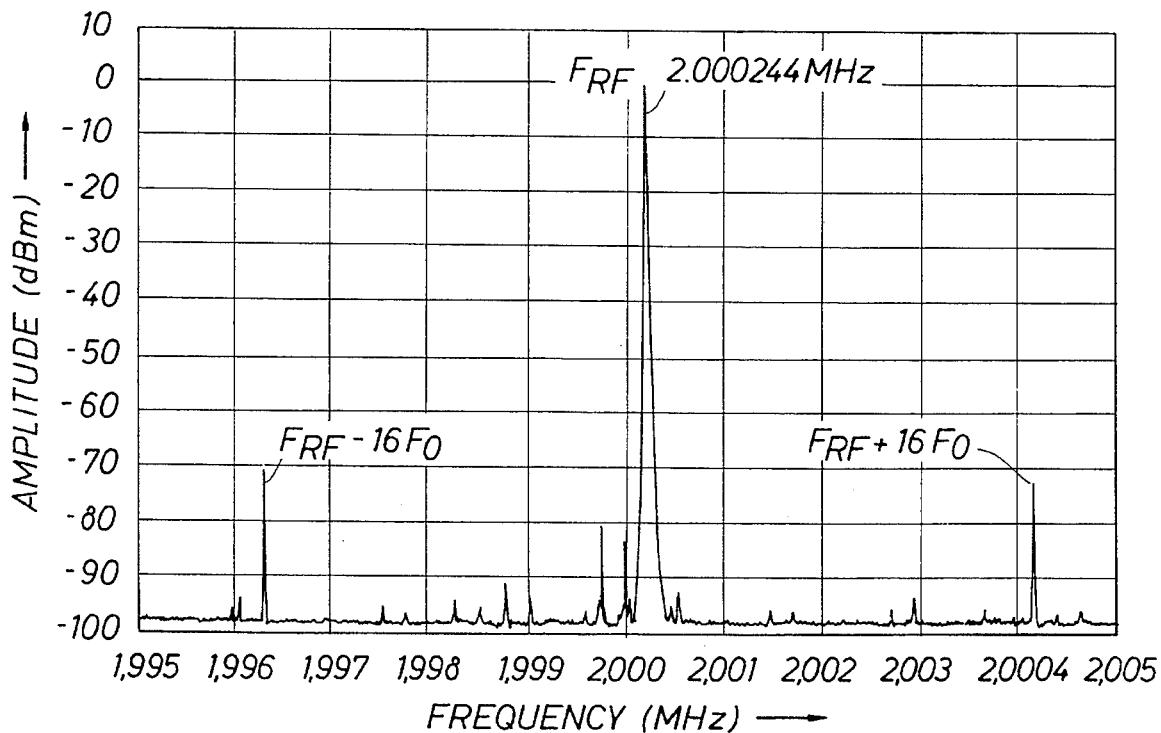
FIG. 5 is a higher resolution frequency spectral display for the system of FIG. 2.

The second group are the spur (spurious) harmonics of $F_O$ that lie very close to $F_{RF}$ and are, therefore, almost impossible to remove by conventional filters. An example is shown in FIG. 5, where spurs having a frequency of $F_{RF} \pm 16 F_o$ are clearly evident with a reduced amplitude about 70 db less than $F_{RF}$. These particular spurs are more pronounced because they are $F_{RF} \pm nF_o$ and result from the fact that each

4 cycle of $F_{RF}$ is generated using only n samples; inaccuracy results from the limited resolution of the DAC 24, but the inaccuracy is statistically reduced over N/n cycles. Thus, the relative amplitude of these spurs is much lower than the harmonics of $F_{RF}$ shown in FIG. 4 that are due to the DAC 24 inaccuracy acting on the ensemble of all N/n cycles equally.

This novel method of frequency synthesis based on the storage of an odd integer number of sine wave cycles in a ROM allows for unprecedented suppression of spur harmonics and the generation of extremely precise RF and local oscillator frequencies with very low phase noise. Any phase modulation of $F_O$ is divided by the binary counter and appears in almost identical amounts in the RF and LO outputs:

RF phase noise, $\phi_{RF} = \phi_C \cdot F_{RF}/F_C$

LO phase noise, $\phi_{LO} = \phi_C \cdot F_{LO}/F_C$

Where $\phi_C$ is the phase noise of the master crystal oscillator 21. Therefore, the phase noise difference, the most important factor in the phase measurement system, may be expressed as:

$$\phi_{DIFF} = \phi_{RF} - \phi_{LO}$$
$$= \phi_C \left[ \frac{F_{RF} - F_{LO}}{F_C} \right]$$
$$= \phi_C [F_O/F_C] = \phi_C/N$$

In the examples given herein, where N=131,072, it can be readily seen that the phase noise of the master crystal oscillator 21 which is already extremely small, can be reduced in the system of the present invention to an insignificant level by the use of the inventive techniques.

Obvious variations on the embodiment present herein, such as the use of the two or more ROMs driven from the same counter to generate two or more sine waves of arbitrary relative frequencies may become apparent to those skilled in the art. The aim of the appended claims is to cover all such changes and modifications as fall within the true spirit and scope of the invention.

While the foregoing is directed to the preferred embodiment of the present invention, other and further embodiments of the invention may be devised without departing from the basic scope thereof, and the scope thereof is determined by the claims which follow.

What is claimed is:

1. A system for use in a well borehole for determining rock properties of an earth formation penetrated by said borehole by generating electromagnetic energy therein, and by measuring the phase shift of said propagated electromagnetic energy between longitudinally spaced locations in said borehole, comprising:

(a) a signal generator, comprising:
   (i) an oscillator providing a first alternating output signal having a first frequency,
   (ii) a multi-stage binary counter operatively coupled to said oscillator to receive said first alternating output signal and to generate a plurality of output line signals, at least one of said output line signals representing a second alternating output signal having a second frequency;
   (iii) a read only memory operatively coupled to receive the output line signals of said multi-stage binary counter, said read only memory comprising an addressable array of binary words, said read only memory producing a read-only-memory output representing multi-bit binary words;

(iv) a digital to analog converter coupled to receive said read-only-memory output and to generate a third alternating output signal having a third frequency in response thereto;

(v) a transmitter for propagating the third alternating output signal within the borehole; and (vi) a receiver for detecting a response measurement signal from the formation penetrated by the borehole;

(b) a heterodyne mixer for mixing said second alternating output signal and said response measurement signal to generate a fourth alternating output signal having a fourth frequency intermediate the second and third frequencies; and (c) means for measuring a phase shift in the fourth alternating output signal, wherein said phase shift is representative of properties of said formation.

2. The system of claim 1 wherein the first frequency of said oscillator operates at a frequency higher than the second frequency or the third frequency.

3. The system of claim 1, wherein said words in said read only memory represent multi-bit representations of the amplitude of a sine wave having a preselected frequency.

4. The system of claim 3 wherein said read only memory contains multiple cycles of said sine wave having said preselected frequency.

5. The system of claim 4 wherein a phase noise difference error of said fourth alternating output signal is given by $\Phi c/N$, where $\Phi c$ is the phase noise generated by said oscillator and N is the memory capacity of said read only memory.

6. The system of claim 1 wherein said second alternating output signal is obtained in a square wave form by tapping one of the output line signals of said multi-stage binary counter.

7. A system for making phase measurements using a heterodyne frequency translation method, the system comprising:

(a) a master clock oscillator operating at a first frequency to generate a master clock signal;

(b) a multi-stage binary counter having as an input said master clock signal and as an output a N-binary digit address bus including N multi-stage binary output lines representative of an N binary digit number, N being an integer number, wherein one of said output lines is tapped to establish a local oscillator frequency signal $(F_{LO})$;

(c) a read only memory having as an input the N-binary digit address bus and having as an output a K-binary digit parallel bus including K binary digit lines, where the K binary digit lines represent at any time the contents of a K binary digit memory word addressed by said N-binary digit address bus;

(d) a digital to analog converter connected to said K-binary digit parallel bus from said read only memory, said digital to analog converter having an output forming a RF measurement frequency signal $(F_{RF})$ for application to a network under test;

(e) a heterodyne mixing circuit connected to receive the local oscillator frequency signal $(F_{LO})$ and the RF measurement frequency signal $(F_R)$ from the network under test, and operable to generate an intermediate clock output frequency signal by mixing the local oscillator frequency signal $(F_{LO})$ and the RF measurement frequency signal $(F_{RF})$; and (f) a phase measurement circuit connected to receive the clock output frequency signal $(F_o)$ and operable to make phase measurements in reference to said output frequency signal.

8. The system of claim 7 wherein said read only memory contains $2^n-1$ memory locations programmed with the values of sine wave amplitudes of a desired preselected RF measurement frequency signal.

9. The system of claim 8 wherein said read only memory contains multiple cycles of said RF measurement frequency signal.

* * * * *